US012694674B2

(12) United States Patent
Jones et al.

(10) Patent No.: US 12,694,674 B2
(45) Date of Patent: Jul. 28, 2026

(54) ANOMALY DETECTION SYSTEM FOR VIDEO SURVEILLANCE

(71) Applicant: Mitsubishi Electric Research Laboratories, Inc., Cambridge, MA (US)

(72) Inventors: Michael Jones, Belmont, MA (US); Ashish Singh, Amherst, MA (US); Erik Learned-Miller, Amherst, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 243 days.

(21) Appl. No.: 18/531,935

(22) Filed: Dec. 7, 2023

(65) Prior Publication Data

US 2025/0191364 A1    Jun. 12, 2025

(51) Int. Cl.
| | |
|---|---|
| *G06V 20/40* | (2022.01) |
| *G06T 7/246* | (2017.01) |
| *G06T 7/73* | (2017.01) |
| *G06V 10/82* | (2022.01) |

(52) U.S. Cl.
CPC .............. *G06V 20/41* (2022.01); *G06T 7/246* (2017.01); *G06T 7/73* (2017.01); *G06V 10/82* (2022.01); *G06V 20/46* (2022.01); *G06T 2207/10016* (2013.01); *G06T 2207/20081* (2013.01); *G06T 2207/20084* (2013.01); *G06T 2207/30241* (2013.01)

(58) Field of Classification Search
CPC ........ G06V 20/41; G06V 10/82; G06V 20/46;
G06V 20/52; G06T 7/246; G06T 7/73;
G06T 2207/10016; G06T 2207/20081;
G06T 2207/20084; G06T 2207/30241
USPC .......................................................... 382/103
See application file for complete search history.

(56) References Cited

U.S. PATENT DOCUMENTS

2020/0013148 A1*    1/2020    Jones ......................... G06T 5/73

OTHER PUBLICATIONS

"Explainable Video Anomaly Localization", Ashish Singh, Michael J. Jones, Erik Learned-Miller, CVPR 2023.

(Continued)

*Primary Examiner* — Stephen P Coleman
(74) *Attorney, Agent, or Firm* — Gene Vinokur

(57) ABSTRACT

A system for video anomaly detection is configured to extract, from a set of input frames of the input video, input appearance features indicative of the appearance of the object in a frame, input size features indicative of the size of the object in the scene, input location features indicative of the location of the object in the scene, and input trajectory features indicative of a trajectory of the object tracked in a set of frames of the input video. The system combines the input appearance features, the input size features, the input location features, and the input trajectory features to produce an input feature vector and compares the input feature vector with each of the exemplars extracted from the normal video to determine the smallest distance from the input feature vector to its closest exemplar. The system declares the anomaly when the smallest distance is greater than a threshold.

16 Claims, 8 Drawing Sheets

(56)  References Cited

OTHER PUBLICATIONS

"Object-centric Auto-encoders and Dummy Anomalies for Abnormal Event Detection in Video", Radu Ionescu, Fahad Shahbaz Khan, Mariana-Iuliana Georgescu, Ling Shao, CVPR 2019.
"Plug-and-Play CNN for Crowd Motion Analysis: An Application in Abnormal Event Detection", Mahdyar Ravanbakhsh; Moin Nabi; Hossein Mousavi; Enver Sangineto; Nicu Sebe, WACV 2018.

* cited by examiner

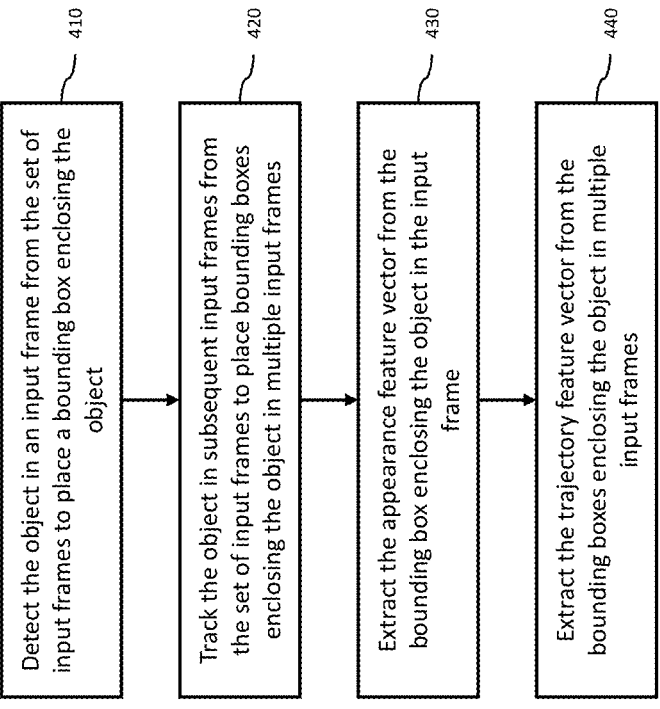

Detect the object in an input frame from the set of input frames to place a bounding box enclosing the object

420

Track the object in subsequent input frames from the set of input frames to place bounding boxes enclosing the object in multiple input frames

430

Extract the appearance feature vector from the bounding box enclosing the object in the input frame

440

Extract the trajectory feature vector from the bounding boxes enclosing the object in multiple input frames

705

Input video frames and object detection bounding boxes

710

Apply an object tracking method to obtain a fixed-length trajectory for each detected object.

720

Set of trajectory features per object

ANOMALY DETECTION SYSTEM FOR VIDEO SURVEILLANCE

TECHNICAL FIELD

This invention relates generally to computer vision and more particularly to detecting anomalous activity in video.

BACKGROUND

Closed-circuit television (CCTV) is widely used for security, transport and other purposes. Example applications include the observation of crime or vandalism in public open spaces or buildings (such as hospitals and schools), intrusion into prohibited areas, monitoring the free flow of road traffic, detection of traffic incidents and queues, and detection of vehicles traveling the wrong way on one-way roads.

The monitoring of CCTV displays (by human operators) is a very laborious task, however, and there is considerable risk that events of interest may go unnoticed. This is especially true when operators are required to monitor a number of CCTV camera outputs simultaneously. As a result, in many CCTV installations, video data is recorded and only inspected in detail if an event is known to have taken place. Even in these cases, the volume of recorded data may be large and the manual inspection of the data may be laborious. Consequently, there is a need for automatic devices to process video images to detect when there is an event of interest. Such detection is referred to herein as video anomaly detection and can be used to draw the event to the immediate attention of an operator, to place an index mark in recorded video, and/or to trigger selective recording of CCTV data.

The problem of video anomaly detection is to automatically detect activity in part of a video that is different from activities seen in normal (training) video of the same scene. For example, the video may be of a street scene with people walking along a sidewalk. Anomalous activity to be detected might be people fighting or climbing over a fence, or a car driving on the sidewalk.

There have been various approaches to the video anomaly detection problem published in the computer vision literature. One class of approaches uses a convolutional neural network autoencoder to learn the typical appearances and motions that occur in the training video. The autoencoder learns to reconstruct typical windows of the training video. To detect anomalies, the autoencoder is used to reconstruct the windows of the testing video. Windows with high reconstruction errors are flagged as anomalous. The main drawback of this method is that rare but normal activity that occurs in the training video is not well modeled which results in lots of false positive anomaly detections in testing videos.

Another class of approaches tries to predict future frames in a test video sequence given preceding frames. A deep neural network is trained on normal video of a scene to minimize the reconstruction error of its prediction of future frames. The assumption is that predicting video frames with normal activity will have low reconstruction error, while predicting frames with unusual activity will have high error. This method has the same drawbacks as autoencoder-based methods.

Another class of approaches is based on learning a dictionary of typical, normal feature vectors found in normal training video and then reconstructing feature vectors computed from test video from the dictionary of feature vectors of the training video. However, this class of approaches is error-prone and computationally expensive and also can miss a rare but normal activity that occurs in the training video.

A fourth class of approaches to video anomaly detection models the probability distribution of features of the video. However, this approach can also miss the rare but normal activity that occurs in the training video.

Accordingly, there is still a need for a system and a method for detecting motion anomalies in the input video capable of distinguishing rare but normal activities in a scene from abnormal activities.

SUMMARY

Some embodiments are based on recognizing that one approach to detecting anomalies in the video is based on learning to either reconstruct normal frames of video or predict future frames of video. However, reconstruction and frame-prediction approaches have flaws, because the models they learn must generalize well enough to reconstruct or predict normal activity that did not exactly occur in the normal training video, they can also reconstruct/predict anomalous patterns. This causes missed anomaly detections. Such models can also have trouble modeling rare, but normal activity which can cause false positives. Furthermore, these models require training a deep neural network for each new scene and retraining when a scene changes which makes them difficult to use in practice.

Instead of the established reconstruction and prediction-based approaches to video anomaly detection, it is an object of some embodiments to form a model of normal activity by storing a set of feature vectors (called exemplars) that represent all of the normal activity occurring in normal (training) video of a scene. Activity in a video is represented by detecting objects (either moving or static) in all or some frames of video and then computing features of each object that represent the object's appearance and motion. The various appearance and motion component features describing an object can be concatenated into a single feature vector for the object.

Exemplars can be selected from the full set of feature vectors representing all objects detected in normal training video for a scene via a number of different algorithms for clustering. An exemplar is a feature vector representing the various appearance and motion component features describing an object that was detected in the normal, training video.

Anomalies in the testing input video are detected by first computing the same type of feature vectors describing all objects in the testing video. Then a testing feature vector is compared to the exemplars that were learned for the scene and the distance to the nearest exemplar is the anomaly score. A low anomaly score means that the testing feature vector was similar to a normal feature vector and is therefore normal. A high anomaly score means that the testing feature vector was unlike any normal feature vector and is therefore anomalous.

The choice of feature vector is important. It is an object of some embodiments for each feature vector to represent the appearance of an object in the video, the trajectory of that object, the size of that object, and the location of that object in the image. To this end, the feature vector includes multiple components. For example, a feature vector includes features indicative of the appearance of an object in the scene, features indicative of the size of the object, features indicative of the location of the object and features indicative of the trajectory of the object tracked in a set of video frames.

In some implementations, the appearance component of the feature vector is an output from an internal layer (typically the penultimate layer) of a deep network trained to recognize objects from an image of an object. The appearance component is indicative of the object class (for example, "person", "car", "bike", etc). The trajectory component of the feature vector is the displacement of the object over a number of consecutive video frames. The trajectory component can be represented as a vector of x-coordinate and y-coordinate displacements indicating how the center of the object moves from frame to frame. The size component is the height and width of a bounding box around the object. The location component of the feature vector is the x and y coordinates of the center of the object in the video frame. Together these components of the feature vector describe both the appearance and the motion of an object.

All of the components of a feature vector can be computed using various methods in computer vision, namely, a multiclass object detector and an object tracker. In some implementations, these methods are realized using deep neural networks that are trained off-line. These neural networks do not need to be retrained on specific normal video for a particular scene. Furthermore, as technology improves and more accurate or more efficient object detectors and object trackers become available, they can be substituted for older methods leading to improvements in video anomaly detection.

Accordingly, different embodiments describe a system of one or more computers that can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by a data processing apparatus, cause the apparatus to perform the actions.

In one general aspect, a system may include an input interface configured to accept an input video of a scene; a memory configured to store a set of exemplars that are feature vectors defining a combination of appearance, size, location, and motion features of objects occurring in normal videos of the scene, where each of the exemplars is separated from its closest exemplar by a minimum distance, where a feature vector of each of the exemplars includes features indicative of the appearance of an object in the scene, features indicative of the size of the object, features indicative of the location of the object and features indicative of a trajectory of the object tracked in a set of frames of the normal videos; a processor configured to extract, from a set of input frames of the input video, input appearance features indicative of the appearance of the object in a frame, input size features indicative of the size of the object in the scene, input location features indicative of the location of the object in the scene, and input trajectory features indicative of a trajectory of the object tracked in a set of frames of the input video; combine the input appearance features, the input size features, the input location features, and the input trajectory features to produce an input feature vector; compare the input feature vector with each of the exemplars to determine the smallest distance from the input feature vector to its closest exemplar; and declare the anomaly when the smallest distance is greater than a threshold. Other embodiments of this aspect include corresponding computer systems, apparatus, and computer programs recorded on one or more computer storage devices, each configured to perform the actions of the methods.

In one general aspect, method may include accepting an input video of a scene. Method may also include accessing a set of exemplars that are feature vectors defining a combination of appearance, size, location, and motion features of objects occurring in normal videos of the scene, where each of the exemplars is separated from its closest exemplar by a minimum distance, where a feature vector of each of the exemplars includes features indicative of the appearance of an object in the scene, features indicative of the size of the object, features indicative of the location of the object and features indicative of a trajectory of the object tracked in a set of frames of the normal videos. Method may furthermore include extracting, from a set of input frames of the input video, input appearance features indicative of the appearance of the object in a frame, input size features indicative of the size of the object in the scene, input location features indicative of the location of the object in the scene, and input trajectory features indicative of a trajectory of the object tracked in a set of frames of the input video. Method may in addition include combining the input appearance features, the input size features, the input location features, and the input trajectory features to produce an input feature vector. Method may moreover include comparing the input feature vector with each of the exemplars to determine the smallest distance from the input feature vector to its closest exemplar. Method may also include declaring the anomaly when the smallest distance is greater than a threshold. Other embodiments of this aspect include corresponding computer systems, apparatus, and computer programs recorded on one or more computer storage devices, each configured to perform the actions of the methods.

In one general aspect, non-transitory computer-readable storage medium may include accepting an input video of a scene; accessing a set of exemplars that are feature vectors defining a combination of appearance, size, location, and motion features of objects occurring in normal videos of the scene, where each of the exemplars is separated from its closest exemplar by a minimum distance, where a feature vector of each of the exemplars includes features indicative of the appearance of an object in the scene, features indicative of the size of the object, features indicative of the location of the object and features indicative of a trajectory of the object tracked in a set of frames of the normal videos; extracting, from a set of input frames of the input video, input appearance features indicative of the appearance of the object in a frame, input size features indicative of the size of the object in the scene, input location features indicative of the location of the object in the scene, and input trajectory features indicative of a trajectory of the object tracked in a set of frames of the input video; combining the input appearance features, the input size features, the input location features, and the input trajectory features to produce an input feature vector; comparing the input feature vector with each of the exemplars to determine the smallest distance from the input feature vector to its closest exemplar; and declaring an anomaly when the smallest distance is greater than a threshold. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 4 shows a flowchart of a method for determining features suitable for video anomaly detection according to some embodiments.

DETAILED DESCRIPTION

Figure 1:
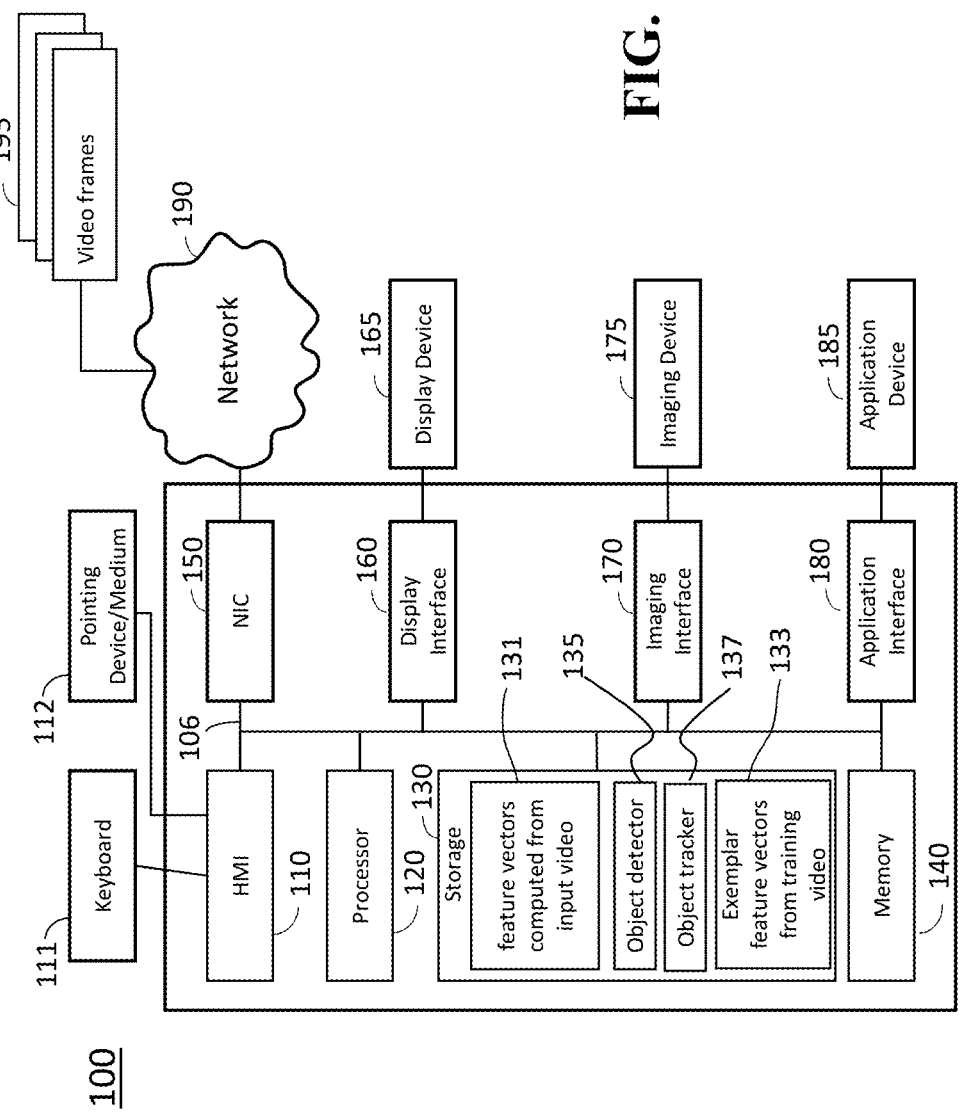
FIG. 1 shows a block diagram of an image processing system for detecting anomalies in videos coming from a camera in accordance with some embodiments.

FIG. 1 shows a block diagram of an image processing system 100 for detecting anomalies in videos coming from a fixed, static camera in accordance with some embodiments. The image processing system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices. These instructions implement a method for detecting anomalies in a video sequence.

In various embodiments, anomaly detection produces a set of bounding boxes indicating the locations and sizes of any anomalies in each video frame. The image processing system 100 is configured to detect anomalies in a video by comparing feature vectors 131 computed from input video to exemplar feature vectors 133, referred to herein as exemplars 133, stored on the storage device 130 that were computed from training video of the same scene. The storage device 130 can be implemented using a hard drive, an optical drive, a thumb drive, an array of drives, or any combination thereof. Feature vectors include appearance, size, and location components computed using an object detection neural network 135 and a trajectory component computed using an object tracker 137. The imaging system 100 implements an anomaly detector that compares feature vectors computed from the input video to feature vectors of the training video of the same scene to declare anomalies when an input feature vector is dissimilar to all exemplar feature vectors from the training video.

In some implementations, a human-machine interface 110 within the image processing system 100 connects the system to a keyboard 111 and pointing device 112, wherein the pointing device 112 can include a mouse, trackball, touchpad, joystick, pointing stick, stylus, or touchscreen, among others. The image processing system 100 can be linked through the bus 106 to a display interface 160 adapted to connect the image processing system 100 to a display device 165, wherein the display device 165 can include a computer monitor, camera, television, projector, or mobile device, among others.

The image processing system 100 can also be connected to an imaging interface 170 adapted to connect the system to an imaging device 175. In one embodiment, the frames of input video on which the anomaly detector is run are received from the imaging device. The imaging device 175 can include a video camera, computer, mobile device, webcam, or any combination thereof.

In some embodiments, the image processing system 100 is connected to an application interface 180 through the bus 106 adapted to connect the image processing system 100 to an application device 185 that can operate based on the results of anomaly detection. For example, device 185 is a surveillance system that uses the locations of detected anomalies to alert a security guard to investigate further.

A network interface controller 150 is adapted to connect the image processing system 100 through the bus 106 to a network 190. Through network 190, the video frames 195, e.g., frames of the normal or training video 133 and/or input or testing video 131 can be downloaded and stored within the computer's storage system 130 for storage and/or further processing. In some embodiments, features computed from the training and input frames of videos are stored instead of the original frames. In such a manner, the storage requirements can be reduced, while improving subsequent processing of the videos.

Some embodiments are based on recognizing that video anomaly detection can be approached by comparing feature vectors that capture both the appearance and motion information of objects in training video to the same types of feature vectors computed from input video. However, storing and comparing all possible feature vectors from the training video is not computationally feasible.

It is an object of some embodiments to address this limitation by selecting a set of representative feature vectors from the training video, called exemplars, that cover the set of all possible feature vectors from the training video. Exemplars can be selected from the full set of training feature vectors using various algorithms such as clustering algorithms or exemplar-selection algorithms. The resulting set of exemplar feature vectors has the property that there is a minimum distance between any two exemplars.

Various exemplar selection algorithms compute a distance between two feature vectors. In some embodiments, a feature vector includes multiple component features for appearance, size, location, and trajectory. Let feature vector $f_1=[a_1, s_1, l_1, t_1]$ where $a_1=[a_{11}, a_{12}, \ldots, a_{1n}]$ is an appearance feature vector of length n, $s_1=[w_1, h_1]$ is the size feature vector representing the width and height of an object bounding box, $l_1=[x_1, y_1]$ is the location feature vector representing the (x,y) image coordinates of the center of an object bounding box and $t_1=[dx_{11}, dy_{11}, dx_{12}, dy_{12} \ldots, dx_{1F}, dy_{1F}]$ is the trajectory feature vector representing the x and y displacements $(dx_{1i}, dy_{1i})$ of the center of the object bounding box for F consecutive video frames.

Different embodiments can use different types of distance formulations. For example, in one embodiment, the distance between two feature vectors $f_1$ and $f_2$ is computed as the maximum distance over each of the component distances:

$$dist(f_1, f_2) =$$

7

-continued $$\max\left(\frac{A(a_1, a_2) - \mu_A}{\sigma_A}, \frac{S(s_1, s_2) - \mu_S}{\sigma_S}, \frac{L(l_1, l_2) - \mu_L}{\sigma_L}, \frac{T(t_1, t_2) - \mu_T}{\sigma_T}\right)$$

where A $(a_1, a_2)$ is an appearance distance, S $(s_1, s_2)$ is a size distance, L $(l_1, l_2)$ is a location distance, and T $(t_1, t_2)$ is a trajectory distance and each of the $\mu$ and $\sigma$ scalars are normalization constants that make each distance function comparable.

The appearance distance is the Euclidean distance between appearance feature vectors, $$A(a_1, a_2) = \sqrt{\sum_{i=1}^{n} (a_{1i} - a_{2i})^2}.$$

The size distance is the Euclidean distance between each object's width and height normalized by the minimum width and height:

$$S(s_1, s_2) = \sqrt{\frac{(w_1 - w_2)^2}{\min(w_1, w_2)} + \frac{(h_1 - h_2)^2}{\min(h_1, h_2)}}.$$

The location distance is the Euclidean distance between the centers of the bounding boxes of the two objects:

$$L(l_1, l_2) = \sqrt{(x_{11} - x_{21})^2 + (y_{11} - y_{21})^2}.$$

The trajectory distance is the sum of the distances between the displacements of the first tracklet and the displacements of the second tracklet divided by the minimum displacements:

$$A(a_1, a_2) = \sum_{i=1}^{n} \left(\frac{|dx_{1i} - dx_{2i}|}{\max(\min(dx_{1i}, dx_{2i}), 1)} + \frac{|dy_{1i} - dy_{2i}|}{\max(\min(dy_{1i}, dy_{2i}), 1)}\right).$$

Other distance functions could be used instead of the ones given above.

Figure 2:
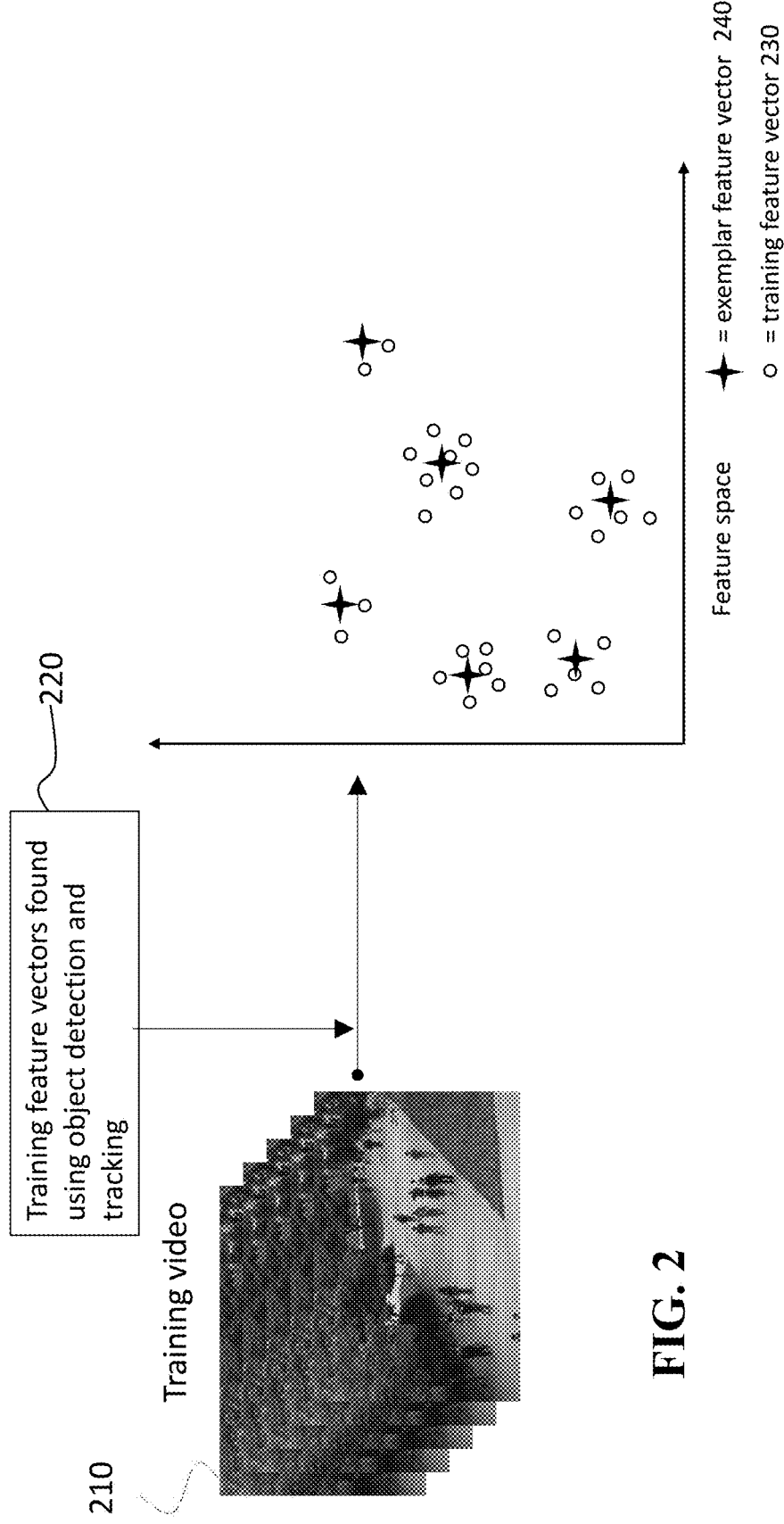
FIG. 2 shows a selection of exemplars from a large set of training feature vectors.

FIG. 2 shows a selection of exemplars from a large set of training feature vectors. Frames of the training video 210 are processed by an object detector and object tracker to compute training feature vectors 230 containing components that represent an object's appearance, size, location, and motion. Some embodiments, use clustering or exemplar selection to select a subset of all training feature vectors called exemplars 240. For example, in some implementations, the set of exemplars has the property that every training feature vector is close to at least one exemplar and no two exemplars are close together.

Figure 3:
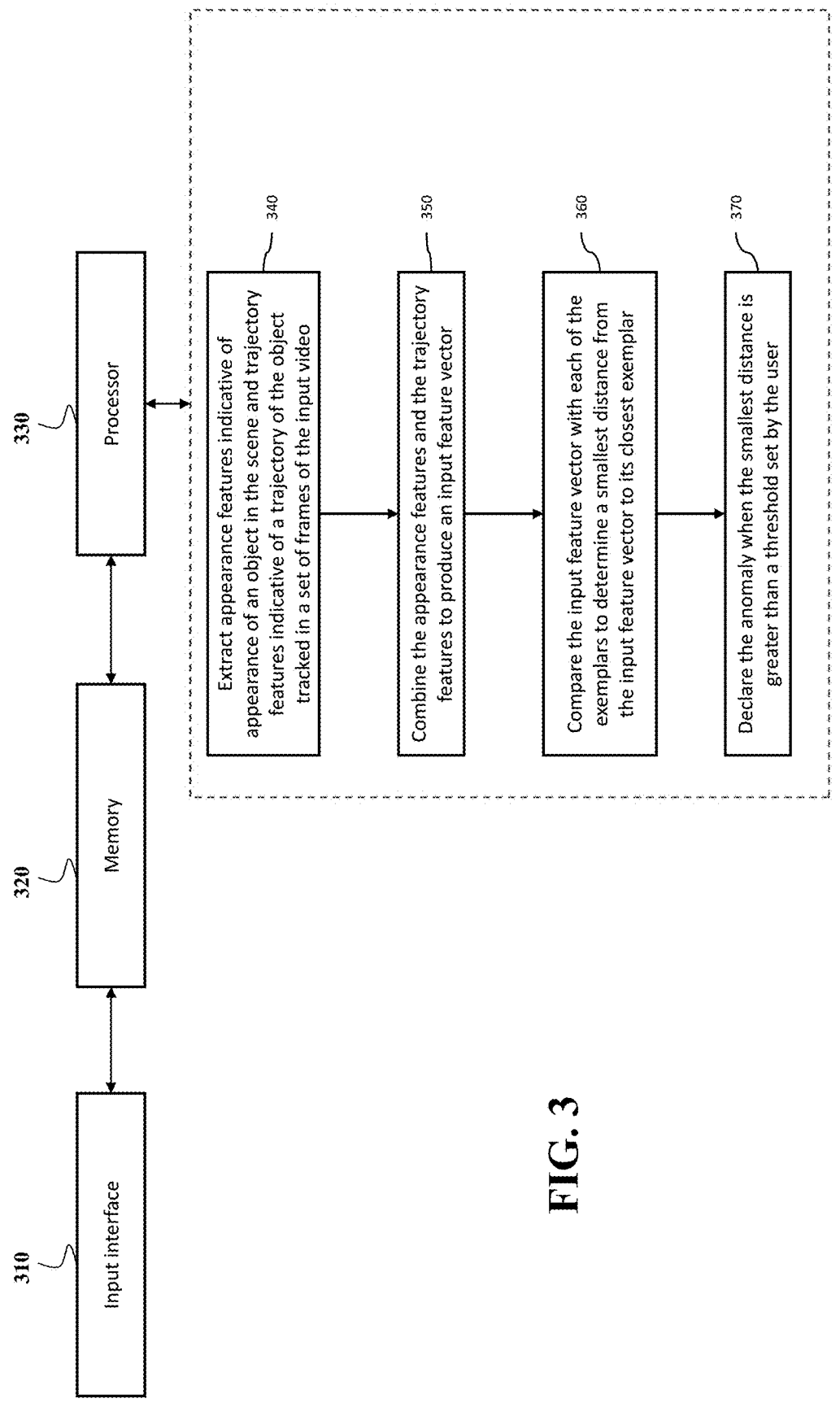
FIG. 3 shows a flowchart of a method performed by the system for anomaly detection according to some embodiments.

FIG. 3 shows a flowchart of a method performed by the system for anomaly detection according to some embodiments. A system for video anomaly detection includes an input interface 310 for accepting an input video of a scene, a memory 320 for storing a set of exemplar feature vectors computed from normal videos of the scene, and a processor 330 for extracting 340 feature vectors consisting of appearance features, trajectory features, size features and location features from the input video frames. The processor 330 combines 350 the appearance, trajectory, size, and location features to produce an input feature vector and compares 360 it with each exemplar to determine the smallest distance to the closest exemplar. An anomaly is declared 370 when the smallest distance exceeds a user-selected threshold. The exemplars in the memory represent features indicative of the appearance, size, and location of different objects in the scene and the trajectories of corresponding objects tracked in a set of consecutive frames of the normal videos. This system enables efficient and accurate detection of anomalies in video surveillance applications.

Some embodiments use different methods for various methods for detecting and tracking objects within a video sequence to extract the appearance, size, location, and trajectory features for anomaly detection. These methods involve analyzing the visual characteristics and motion patterns of objects to identify anomalies or abnormal behavior. For example, one method involves object detection, where algorithms are used to identify and localize objects within individual frames of a video. This can be achieved using various image processing techniques which typically involve training on example images of the object classes of interest. Once an object is detected, a bounding box is placed around it to define its location and spatial extent. A feature vector is computed from the image patch inside the bounding box that is representative of the object class appearing within the image patch. This approach only provides information about the object's appearance, location, and size in a single frame and does not consider its temporal behavior.

Another method involves object tracking, which aims to follow the movement of objects across multiple, consecutive frames of a video. Various tracking algorithms have been developed, including correlation-based methods, optical flow-based methods, and Kalman filter-based methods. These algorithms use the object's position in previous frames to predict its location in subsequent frames, allowing for the placement of bounding boxes around the object in multiple frames. Such tracking algorithms compute the trajectory of an object over multiple, consecutive frames.

Some embodiments are based on the understanding that both object detection and tracking approaches can be used separately in video anomaly detection, the separate and/or independent utilization of these approaches often fails to provide a comprehensive solution that combines both appearance and trajectory features. The lack of integration between these features limits the accuracy and effectiveness of anomaly detection algorithms. Therefore, some embodiments determine features suitable for video anomaly detection by combining the extraction of appearance features from individual frames and trajectory features from multiple frames.

FIG. 4 shows a flowchart of a method for determining features suitable for video anomaly detection according to some embodiments. A method includes detecting 410 an object in an input frame from a set of input frames and placing a bounding box around the object. The method further involves tracking 420 the object in other input frames from the set of input frames and placing bounding boxes around the object in multiple input frames. Appearance, size, and location features are extracted 430 from the bounding box enclosing the object in the input frame, and trajectory features are extracted 440 from the bounding boxes enclosing the object in multiple input frames. These extracted features can be used to determine suitable features for video anomaly detection, enabling the identification of abnormal events or behaviors in video surveillance systems.

Various embodiments use different methods for detecting objects and determining their trajectories. Some methods use manual feature engineering, where specific features of an object are identified and extracted from the input data.

These features are then used to train a classifier or regression model to detect and track the object. However, this approach is limited by the ability of human experts to accurately identify relevant features and may not be effective in complex or dynamic environments.

Some embodiments are based on recognizing that in recent years, there has been a significant advancement in the field of machine learning, particularly with the development of neural networks. Neural networks are computational models inspired by the structure and function of the human brain. They include interconnected nodes, or artificial neurons, that process and transmit information. By training neural networks with large amounts of labeled data, they can learn to recognize patterns and make predictions or classifications.

Machine learning techniques, such as neural networks, have been applied to object detection and tracking tasks with promising results. These methods can automatically learn relevant features from the input data, eliminating the need for manual feature engineering. By training neural networks with labeled data, they can learn to detect objects and accurately determine their trajectories.

However, while machine learning-based approaches have shown great potential, there are still challenges to be addressed. These include the need for large amounts of labeled training data, the computational complexity of training and inference, and the interpretability of the learned models. However, some embodiments are based on the understanding that neural networks trained for various tasks not related to video anomaly detection can be adapted and/or reused to extract the appearance and trajectory features.

Figure 5:
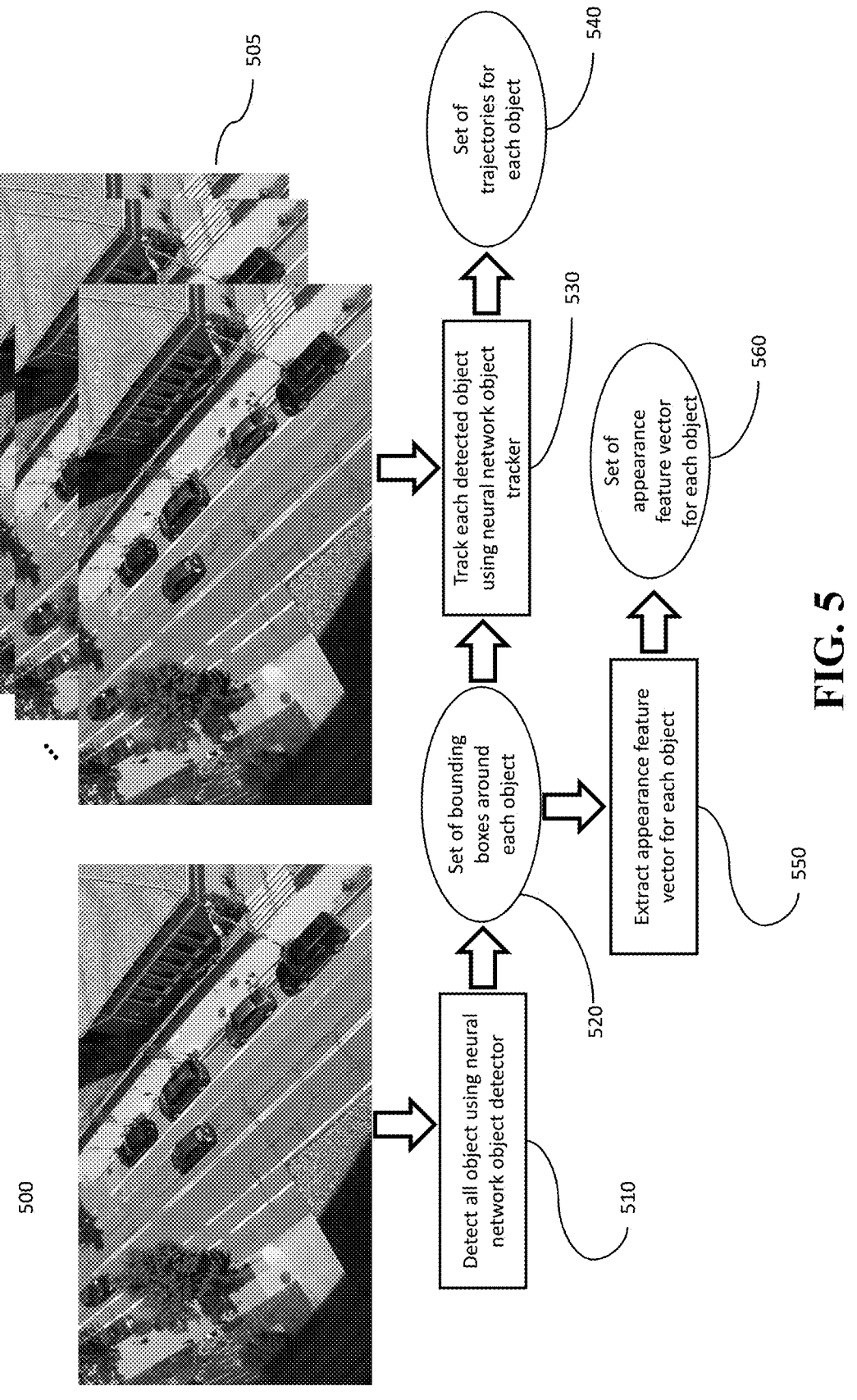
FIG. 5 shows a schematic of a method for detecting objects in an image, extracting appearance, size, and location features for each object, and determining the trajectory of each object using multiple neural networks trained with machine learning according to some embodiments.

FIG. 5 shows a schematic of a method for detecting objects in an image, extracting appearance, size, and location features for each object, and determining the trajectory of each object using multiple neural networks trained with machine learning according to some embodiments. The method involves the execution 510 of a neural network trained for object detection on an input image 500 to detect all objects of interest. The object detection neural network outputs a set of bounding boxes 520 giving the size and location of each detected object. Appearance feature vectors 560 can also be extracted 550 from the object detection network or appearance feature vectors 560 can be extracted 550 from a separate object recognition neural network that takes an image patch defined by an object bounding box 520 as input and outputs an appearance feature vector 560. The object bounding boxes 520 as well as subsequent video frames 505 are then input to a neural network 530 trained to track objects. The neural network object tracker 530 outputs a trajectory 540 for each detected object. A trajectory consists of a list of horizontal and vertical displacements of the center of the object bounding box for a fixed number of frames of video. By leveraging the capabilities of machine learning, the method provides accurate and efficient object detection and trajectory determination.

In the context of extracting appearance features from an image patch containing an object wherein the image patch is defined by a bounding box in an input image, deep neural networks have been utilized to learn discriminative representations of object appearances. By training the network on a large dataset of image patches containing objects, the network can learn to extract features that are highly informative for object classification. Such neural networks typically have an embedding layer (typically the penultimate network layer) which is a feature vector that is then mapped to a set of object class probabilities that estimate the probability that the input image patch contains each of the known object classes on which the neural network is trained. Some embodiments are based on recognizing that while these methods can focus on using the output of the final layer (class probabilities) of the network as the appearance features, these methods can be suboptimal when the object appearing in the scene is absent from the training dataset. In the case where the input image contains an unknown object not in the training set, the feature vector in the embedding layer may still be indicative of the object class even though the output class probabilities are unable to express the unknown class. To address these issues, some embodiments use the output of the embedding layer of the deep neural network as the appearance feature vector. In such a manner, the relevant appearance features can be extracted even for the previously unseen object in a standard manner. The object recognition neural network for computing appearance features can be an independently trained neural network that takes as input an image patch extracted from an input image according to an object detection bounding box. Alternatively, the object recognizer can be part of a larger object detection neural network that both localizes objects in an input image and recognizes the object class of each detected object.

Figure 6:
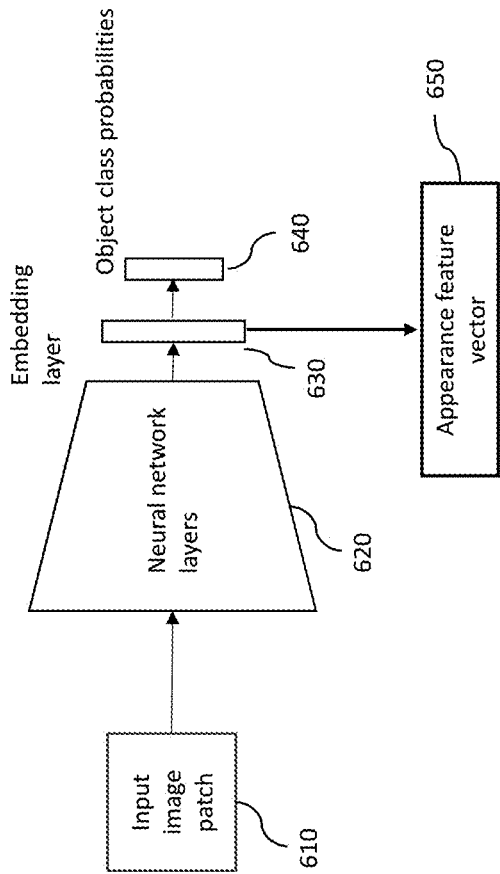
FIG. 6 shows a flowchart of a method for extracting appearance features from an image patch of an object defined by a bounding box from an input frame according to some embodiments.

FIG. 6 shows a flowchart of a method for extracting appearance features from an image patch of an object defined by a bounding box from an input frame according to some embodiments. The method includes taking as input an image patch 610 and applying neural network layers 620 to it which results in an embedding layer 630 which is a feature vector that is indicative of the class of the object. The embedding layer is used to compute class probabilities 640. The feature vector of the embedding layer 630 is used as the appearance vector 650 in some embodiments. This method enables the extraction of appearance features that can be used for various applications, including video anomaly detection.

Some embodiments use various methods for extracting trajectory features from video. A trajectory feature for an object detected in a video frame consists of a list of (x,y) displacements of the center of the object's bounding box in the F consecutive frames: $\{(x_i, y_i)\}_{i=1:F}$. F is a whole number parameter chosen depending on the application.

There are many methods for tracking multiple objects in video used by different embodiments. Examples of object-tracking methods include visual tracking methods, tracking by detection methods, and optical flow-based methods. Visual tracking methods use the appearance of the object in the first frame and try to find similar appearances in subsequent frames. Tracking by detection methods uses the bounding boxes output by an object detector applied to all the frames and associates bounding boxes from one frame to the next. Optical flow-based methods first compute the pixel-wise optical flow between all frames and then use the pixel-wise displacements to track an object.

Some embodiments use various methods for extracting trajectory features from multiple bounding boxes by analyzing the motion vectors between consecutive frames to determine the direction and speed of an object's movement. These methods typically involve tracking the movement of individual pixels within the bounding boxes and calculating the displacement between consecutive frames. However, these methods may suffer from inaccuracies and limitations in capturing the complete trajectory information due to the reliance on pixel-level tracking.

Alternative embodiments use optical flow algorithms to estimate the motion vectors between frames. Optical flow algorithms analyze the changes in pixel intensities between consecutive frames to determine the direction and magnitude of motion. While optical flow methods can provide more accurate motion estimation, they often struggle with handling occlusions, rapid motion, and complex scenes, which can lead to errors in trajectory feature extraction.

Alternative embodiments utilize object detection algorithms to identify and track objects within the bounding boxes. These algorithms typically rely on machine learning models trained on large datasets to detect and track objects based on their visual appearance. Some embodiments, however, overcome these limitations by determining the trajectory features from multiple bounding boxes using a combination of the sequence of coordinates and motion vectors connecting neighboring coordinates. By incorporating both spatial and temporal information, the method of these embodiments provides a more accurate and comprehensive representation of the trajectory features.

Figure 7:
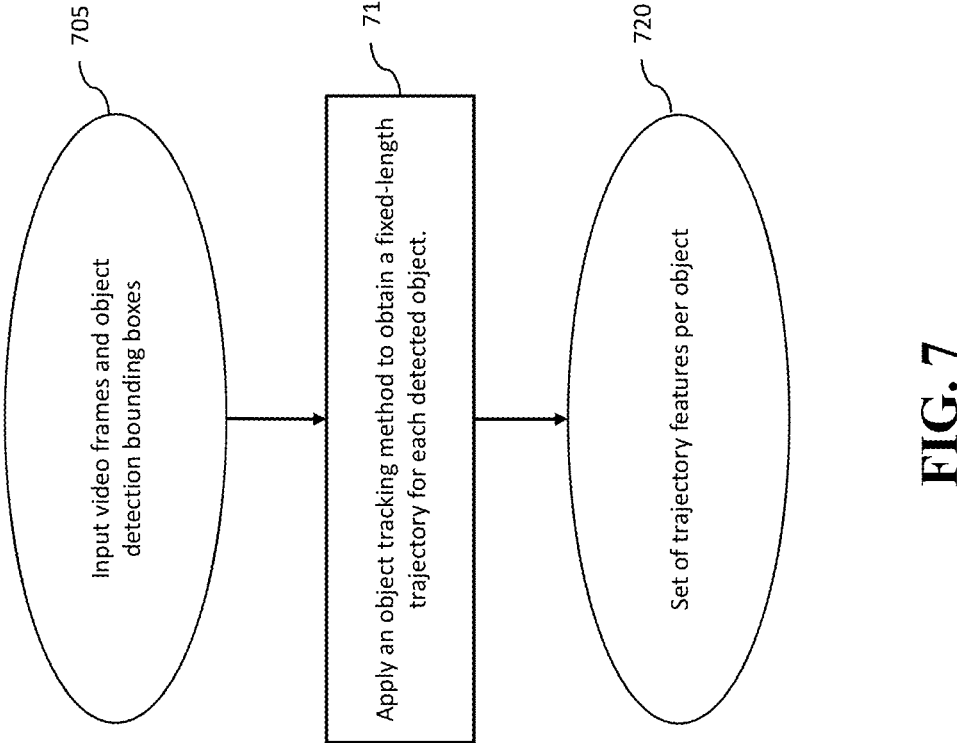
FIG. 7 shows a flowchart of a method for extracting the trajectory features from frames of video and the bounding boxes of objects detected by an object detector in all frames according to some embodiments.

FIG. 7 shows a flowchart of a method for extracting the trajectory features from frames of video and the bounding boxes of objects detected by an object detector in all frames 705. The method involves using an object tracking method 710. The resulting trajectory features $\{(x_i, y_i)\}_{i=1:F}$ 720 for each detected object are output by the object tracking method 710.

Figure 8:
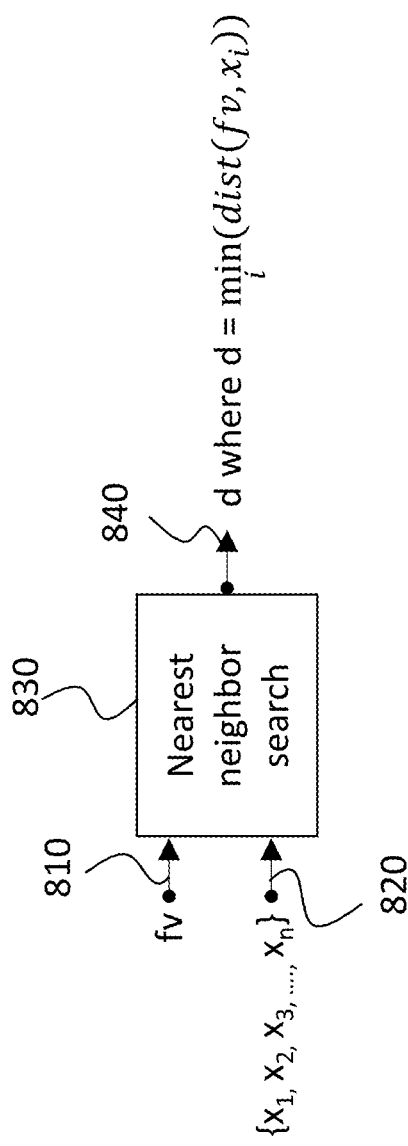
FIG. 8 shows a schematic of a nearest neighbor search method used by some embodiments to find the closest exemplar to a testing input feature vector.

FIG. 8 shows a schematic of a nearest neighbor search method used by some embodiments to find the closest exemplar to a testing input feature vector. In FIG. 8, fv 810 is the input feature vector and each $x_i$ 820 is an exemplar. The nearest neighbor search 830 outputs the minimum distance, d, 840 between fv and the nearest $x_i$. Different embodiments use different nearest-neighbor searches. For example, one embodiment uses brute force search to compare each input feature vector with each training feature vector. In some implementations, the nearest neighbor search 830 is an approximate nearest neighbor search, which is not guaranteed to find the minimum distance but may instead find a feature vector that is close to the minimum. Various nearest neighbor search algorithms known in the field could be used such as k-d trees, k-means trees, and locality-sensitive hashing.

The above-described embodiments of the present invention can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A system for video anomaly detection for surveillance, comprising:

a memory configured to store a set of exemplars that are feature vectors defining a combination of appearance, size, location, and motion features of objects occurring in normal videos of a scene, wherein each of the exemplars is separated from its closest exemplar by a minimum distance, wherein a feature vector of each of the exemplars includes features indicative of the appearance of an object in the scene, features indicative of the size of the object, features indicative of the location of the object and features indicative of a trajectory of the object tracked in a set of frames of the normal videos, wherein the feature vectors are determined by an object detection neural network and an object tracker; and a processor configured to:

extract, from a set of input frames of an input video of the scene, one or more input features, the one or more input features comprising input appearance features indicative of the appearance of the object in a frame, input size features indicative of the size of the object in the scene, input location features indicative of the location of the object in the scene, and input trajectory features indicative of a trajectory of the object tracked in the set of input frames of the input video, wherein extracting the one or more input features comprise detecting the object in an input frame from the set of input frames to place a bounding box enclosing the object, wherein the bounding box is generated by the object detection neural network;

combine the input appearance features, the input size features, the input location features, and the input trajectory features to produce an input feature vector;

compare, by an anomaly detector, the input feature vector with each of the exemplars to determine the smallest distance from the input feature vector to its closest exemplar;

declare an anomaly based on the smallest distance being greater than a threshold; and trigger an alarm in response to the declared anomaly.

2. The system of claim 1, wherein the processor is configured to:

track the object in other input frames from the set of input frames to place bounding boxes enclosing the object in multiple input frames;

extract the input appearance features from the bounding box enclosing the object in the input frame;

extract the input size features from the bounding box enclosing the object in the input frame;

extract the input location features from the bounding box enclosing the object in the input frame; and extract the input trajectory features from the bounding boxes enclosing the object in multiple input frames.

3. The system of claim 2, wherein the processor is configured to detect the object and determine the trajectory of the object by executing one or multiple neural networks trained with machine learning.

4. The system of claim 2, wherein, to extract the input appearance features from a bounding box enclosing the object in the input frame, the processor is configured to;

extract features of the bounding box enclosing the object in the input frame with a deep neural network trained to classify the object; and form the input appearance features as an output of an internal layer of the deep neural network.

5. The system of claim 2, wherein, to extract the trajectory features from the multiple bounding boxes, the processor is configured to:

determine coordinates of pixels at the center of each of the multiple bounding boxes to form a sequence of coordinates; and form the trajectory features as horizontal and vertical displacements of the coordinates from one frame to a next frame in the sequence of coordinates.

6. The system of claim 1, wherein the processor is configured toto process the input video with a sliding temporal window method to produce the set of input frames at different iterations.

7. The system of claim 6, wherein a shift of the sliding window method is fixed.

8. The system of claim 1, wherein to determine the closest distance, the processor is configured to determine a distance between the input feature vector and an exemplar as a normalized combination of distances between each group of corresponding features of the input feature vector and the exemplar.

9. The system of claim 1, wherein the processor is configured to detect multiple objects in the set of input frames and determine the anomaly by analyzing input exemplars determined for all of the detected objects.

10. The system of claim 1, wherein the processor, to determine the exemplars, is configured to:

extract, from frames of the normal video, multiple normal exemplars including combinations of features indicative of the appearance and the trajectory of objects detected in the normal video; and prune the multiple normal exemplars to produce the exemplars.

11. A method for video anomaly detection for surveillance, wherein the method uses a processor coupled with stored instructions implementing the method, wherein the instructions, when executed by the processor carry out steps of the method, comprising:

accessing a set of exemplars that are feature vectors defining a combination of appearance, size, location, and motion features of objects occurring in normal videos of a scene, wherein each of the exemplars is separated from its closest exemplar by a minimum distance, wherein a feature vector of each of the exemplars includes features indicative of the appearance of an object in the scene, features indicative of the size of the object, features indicative of the location of the object and features indicative of a trajectory of the object tracked in a set of frames of the normal videos, wherein the feature vectors are determined by an object detection neural network and an object tracker;

extracting, from a set of input frames of an input video of the scene, one or more input features, the one or more input features comprising input appearance features indicative of the appearance of the object in a frame, input size features indicative of the size of the object in the scene, input location features indicative of the location of the object in the scene, and input trajectory features indicative of a trajectory of the object tracked in the set of input frames of the input video, wherein extracting the one or more input features comprise detecting the object in an input frame from the set of input frames to place a bounding box enclosing the object, wherein the bounding box is generated by the object detection neural network;

combining the input appearance features, the input size features, the input location features, and the input trajectory features to produce an input feature vector;

comparing the input feature vector with each of the exemplars to determine the smallest distance from the input feature vector to its closest exemplar;

declaring an anomaly when the smallest distance is greater than a threshold; and triggering an alarm in response to the anomaly.

12. The method of claim 11, further comprising:

tracking the object in other input frames from the set of input frames to place bounding boxes enclosing the object in multiple input frames;

extracting the input appearance features from the bounding box enclosing the object in the input frame;

extracting the input size features from the bounding box enclosing the object in the input frame;

extracting the input location features from the bounding box enclosing the object in the input frame; and extracting the input trajectory features from the bounding boxes enclosing the object in multiple input frames.

13. The method of claim 12, further comprising:

executing one or multiple neural networks trained with machine learning to detect the object and determine the trajectory of the object.

14. The method of claim 12, wherein, to extract the input appearance features from a bounding box defined by a bounding box enclosing the object in the input frame, the method comprises:

extracting features of the bounding box enclosing the object in the input frame with a deep neural network trained to classify the object; and forming the input appearance features as an output of an internal layer of the deep neural network.

15. The method of claim 12, wherein, to extract the trajectory features from the multiple bounding boxes, the method comprises:

determining coordinates of pixels at the center of each of the multiple bounding boxes to form a sequence of coordinates; and forming the trajectory features as horizontal and vertical displacements of the coordinates from one frame to next frame in the sequence of coordinates.

16. A non-transitory computer-readable storage medium embodied thereon a program executable by a processor for performing a method for video anomaly detection for surveillance, the method comprising:

accessing a set of exemplars that are feature vectors defining a combination of appearance, size, location, and motion features of objects occurring in normal videos of a scene, wherein each of the exemplars is separated from its closest exemplar by a minimum distance, wherein a feature vector of each of the exemplars includes features indicative of the appearance of an object in the scene, features indicative of the size of the object, features indicative of the location of the object and features indicative of a trajectory of the object tracked in a set of frames of the normal videos, wherein the feature vectors are determined by an object detection neural network and an object tracker;

extracting, from a set of input frames of an input video of the scene, one or more input features, the one or more input features comprising input appearance features indicative of the appearance of the object in a frame, input size features indicative of the size of the object in the scene, input location features indicative of the location of the object in the scene, and input trajectory features indicative of a trajectory of the object tracked in the set of input frames of the input video, wherein extracting the one or more input features comprise detecting the object in an input frame from the set of input frames to place a bounding box enclosing the object, wherein the bounding box is generated by the object detection neural network;

combining the input appearance features, the input size features, the input location features, and the input trajectory features to produce an input feature vector;

comparing, by an anomaly detector, the input feature vector with each of the exemplars to determine the smallest distance from the input feature vector to its closest exemplar;

declaring an anomaly when the smallest distance is greater than a threshold; and triggering an alarm in response to the anomaly.

\* \* \* \* \*